United States Patent
Boxley

(10) Patent No.: US 8,038,789 B2
(45) Date of Patent: Oct. 18, 2011

(54) PERVIOUS CONCRETE COMPRISING A GEOPOLYMERIZED POZZOLANIC ASH BINDER

(75) Inventor: Chett Boxley, Park City, UT (US)

(73) Assignee: Ceramatec, Inc., Salt Lake City, UT (US)

(*) Notice: Subject to any disclaimer, the term of this patent is extended or adjusted under 35 U.S.C. 154(b) by 0 days.

(21) Appl. No.: 12/553,270

(22) Filed: Sep. 3, 2009

(65) Prior Publication Data

US 2010/0058957 A1 Mar. 11, 2010

Related U.S. Application Data

(60) Provisional application No. 61/095,542, filed on Sep. 9, 2008.

(51) Int. Cl.
C04B 28/22 (2006.01)
(52) U.S. Cl. ........ 106/672; 106/679; 106/705; 106/713; 106/789; 106/DIG. 1
(58) Field of Classification Search .............. 106/705, 106/713, 789, DIG. 1, 672, 679
See application file for complete search history.

(56) References Cited

U.S. PATENT DOCUMENTS

| | | | |
|---|---|---|---|
| 4,210,457 A | 7/1980 | Dodson et al. | |
| 4,640,715 A * | 2/1987 | Heitzmann et al. | 106/706 |
| 4,642,137 A * | 2/1987 | Heitzmann et al. | 106/607 |
| 4,842,649 A | 6/1989 | Heitzmann et al. | |
| 5,399,246 A | 3/1995 | Joshi | |
| 5,601,643 A | 2/1997 | Silverstrim et al. | |
| 5,820,668 A | 10/1998 | Comrie et al. | |
| 5,968,254 A | 10/1999 | Dodgen et al. | |
| 5,997,632 A | 12/1999 | Styron et al. | |
| 6,204,430 B1 | 3/2001 | Baldwin et al. | |
| 6,482,258 B2 | 11/2002 | Styron et al. | |
| 6,802,898 B1 | 10/2004 | Liskowitz et al. | |
| 6,869,473 B2 | 3/2005 | Comrie | |
| 7,141,112 B2 | 11/2006 | Comrie et al. | |
| 7,883,576 B2 * | 2/2011 | Comrie | 106/600 |
| 2002/0017224 A1 | 2/2002 | Horton | |
| 2003/0233962 A1 | 12/2003 | Dongell | |
| 2004/0168611 A1 | 9/2004 | Dresin et al. | |
| 2008/0017077 A1 | 1/2008 | Abbate | |

OTHER PUBLICATIONS

Gao, Yu-Ming et al., "Effects of Carbon on Air Entrainment in Fly Ash Concrete: The Role of Soot and Carbon Black", *Energy & Fuels*, 11,(1997),457-462.

(Continued)

*Primary Examiner* — Paul Marcantoni
(74) *Attorney, Agent, or Firm* — David Fonda

(57) ABSTRACT

A process for making a pervious concrete comprising a geopolymerized pozzolanic ash. Generally, the process includes mixing a solid aggregate and a geopolymerized pozzolanic ash binder together to form a pervious concrete mixture. Some examples of suitable aggregates comprise recycled carpet, recycled cement, and aggregates of coal-combustion byproducts. The geopolymerized pozzolanic ash binder is made by combining a pozzolanic ash, such as fly ash, with a sufficient amount of an alkaline activator and water to initiate a geopolymerization reaction. The activator solution may contain an alkali metal hydroxide, carbonate, silicate, aluminate, or mixtures thereof. In some aspects, the final concrete forms a solid mass in the form of pavement or a pre-cast concrete shape. The solid mass of concrete may have a void content of between about 5% and about 35%.

23 Claims, 1 Drawing Sheet

OTHER PUBLICATIONS

Young, Lee W., "International Search Report", International Application No. PCT/US 08/08461, (Oct. 10, 2008),1-2.

Young, Lee W., "Written Opinion of the International Searching Authority", International Application No. PCT/US 08/08461, (Oct. 10, 2008),1-5.

Shin, Sang Hoon "International Search Report", International App. No. PCT/US2009/055909, (Apr. 13, 2010),1-3.

Shin, Sang Hoon "Written Opinion of the International Searching Authority", International App. No. PCT/US2009/055909, (Apr. 13, 2010),1-5.

* cited by examiner

PERVIOUS CONCRETE COMPRISING A GEOPOLYMERIZED POZZOLANIC ASH BINDER

CROSS-REFERENCE TO RELATED APPLICATION

This application claims the benefit of U.S. Provisional Application No. 61/095,542, filed Sep. 9, 2008, entitled "Fly Ash Concrete for Pavement Applications" the entire disclosure of which is hereby incorporated by reference.

FIELD OF THE INVENTION

This invention relates to concrete suitable for use in a variety of applications. More specifically this invention relates to a pervious concrete comprising a course aggregate and a geopolymerized pozzolanic ash binder. The concrete may be formulated for use in pervious pavement as well as in pre-cast concrete shapes. The described concrete may be made entirely from recycled materials.

BACKGROUND OF THE INVENTION

Fly ash, bark ash, spray dryer ash, bottom ash, bottom slag, boiler slag, and other pozzolanic ashes are typically produced as waste byproducts from certain combustion or chemical processes. Most of these pozzolanic ashes are disposed of in landfills or similar large waste-containment facilities. Increasingly, however, some pozzolanic ashes are being used as a partial replacement for Portland cement in concrete mixtures. By way of example, while Table 1 shows the majority of the 71 million tons of fly ash produced in the United States in 2004 was treated as waste and disposed of in landfills or surface impoundments, Table 1 also shows that approximately 40% of the fly ash was recycled into various applications. Specifically, Table 1 shows that the largest amount of the recycled fly ash was used as a partial replacement for Portland cement in concrete and grout.

TABLE 1

Fate of fly ash from coal combustion in the United States in 2004

| Fate | Millions of tons | % |
|---|---|---|
| Landfill disposal | 42.7 | 60 |
| Concrete/grout | 14.5 | 20 |
| Structural fills | 4.7 | 6.6 |
| Waste stabilization | 2.4 | 3.4 |
| Mining applications | 1.1 | 1.5 |
| Raw feed for cement kiln | 2.3 | 3.2 |
| Road base/sub-base | 0.7 | 1.0 |
| Flowable fill | 0.8 | 1.1 |
| Other | 1.8 | 2.5 |
| Total | 71 | 100 |

Recent goals, set by several fly-ash-producing industries and the federal government, seek for increased use of fly ash (e.g., 50% utilization of fly ash by 2011) and other pozzolanic ashes. However, under certain current methods, concrete requires Portland cement as a cementitious binder and the amount of fly ash that can be used in the concrete is often limited.

One of the main reasons that only a small amount of fly ash is suitable for use as a concrete additive is that fly ash, which contains carbon, may absorb costly air-entraining agents (AEAs), which are added to concrete in order to improve its workability and resistance towards freeze-thaw damage. When carbon absorbs air-entraining agents, the agents become less available to entrain tiny air bubbles in the concrete that give concrete its protection against freeze-thaw conditions. Because the carbon content of fly ash can vary widely depending upon the fuel source and boiler-burn conditions, some fly ashes are better than others for use in concrete.

Where fly ash is used to fabricate concrete, the fly-ash-containing concrete is often made to be impervious to water. As a result, water is often unable to drain through the impervious concrete to replenish the water table, and the water is directed to storm drains or retention ponds. This implies that traditional concrete can increase stormwater runoff. Similarly, because impervious concrete may not allow water to seep directly through it into the ground, such concrete may increase chances of flooding and prevent urban trees and vegetation from having viable rooting space.

In light of the aforementioned discussion, it would be an improvement in the art to provide an environmentally favorable use for pozzolanic ashes, such as fly ash, that would otherwise be disposed of in landfills or in large waste containment facilities. Additionally, it would be an improvement to provide concrete containing pozzolanic ashes, wherein the concrete is pervious to water.

BRIEF SUMMARY OF THE INVENTION

The invention is drawn to a concrete material that includes a solid, coarse aggregate material and a geopolymerized pozzolanic ash binder. The solid aggregate and binder may comprise recycled materials. Pervious concretes made entirely from recycled materials offer many significant benefits to society. In particular, the described pervious concrete can be extremely durable. Additionally, the pervious concrete can cost less to maintain, offer superior performance for removal of groundwater contaminants, and require fewer environmentally damaging constituents than certain competing materials, such as concretes which contain relatively large amounts of Portland cement.

The pervious concrete described herein may be used in numerous applications, such as in roads, parking lots, driveways, sidewalks, pre-cast concrete shapes (e.g., pavers, bricks, blocks, stones, tiles, panels, walls, or any other pre-cast structure that may benefit from water drainage). In one embodiment, the pervious concrete utilizes a geopolymerized pozzolanic ash as the cementitious binder material and a solid coarse aggregate that is made of recycled material. In one embodiment, using only these readily-available recycled materials with no Portland cement or virgin crushed stone provides an environment friendly or green way to manufacture the described pervious concrete. In other embodiments, reduced amounts of Portland cement may be used, however, eliminating the use of Portland cement eliminates the environmental cost associated with manufacturing Portland cement, including carbon dioxide emissions.

The solid aggregate can comprise any material that is suitable for use in concrete and which is capable of binding with the geopolymerized fly ash binder to form the pervious concrete. In one implementation, the solid aggregate comprises crushed recycled concrete, which can be made from unused freshly mixed concrete or from construction and demolition debris. In another implementation, the solid aggregate comprises recycled carpet. In still another implementation, the aggregate is made from bottom ash, slag, large area fly ash, or from another aggregate material produced as a byproduct of coal combustion.

The solid aggregate can be any size and have any other suitable characteristic. In some cases, the aggregate is sized to promote a void content between about 5% and about 35% in the concrete. This void content may be enhanced and optimized by limiting or controlling the size and quantity of fine aggregate and/or sand used in the pervious concrete.

The pozzolanic ash can comprise a variety of coal-combustion waste products that geopolymerize when reacted with an alkaline activator and water. Some examples of suitable pozzolanic ashes include, but are not limited to, fly ash, spray dryer ash, bark ash, bottom ash, bottom slag, boiler slag, etc., and mixtures thereof.

The alkaline activator has a pH that is sufficiently high to initiate a geopolymerization reaction with the pozzolanic ash. The alkaline activator may contain, without limitation, a metal carbonate, a metal silicate, a metal aluminate, a metal sulfate, a metal hydroxide, and mixtures thereof. In one embodiment, the mixture comprises an alkali carbonate and an alkali hydroxide. While alkali metals are used in some embodiments because of their availability and cost, the described invention is not limited to alkali metals. Additionally, the ingredients of the alkaline activator need not be specially manufactured or pure ingredients. Indeed, the alkaline activator may be prepared using recycled byproducts of industrial processes.

In the pervious concrete, the amount of pozzolanic ash, alkaline activator, and water may be controlled to create a paste that forms a thick coating around the aggregate particulates. Using sufficient paste to coat and bind the aggregate particulates together creates a system of highly permeable, interconnected voids that drains quickly. In some embodiment, flow rates for water through pervious concrete may be around 480 in/hr (0.34 cm/s, which is 5 gal/ft$^2$/min or 200 L/m$^2$/min), although they can be much higher.

In some implementations, the pervious concrete includes a catalytic nano-material. Although the catalytic nano-material can perform several functions, the nano-material is often selected to catalyze the oxidation of organic pollutants that contact the pervious concrete. Examples of suitable catalytic nano-materials include, but are not limited to, titanium dioxide, magnesium oxide, and mixtures thereof. The catalytic nano-material may be in an amorphous phase or crystalline phases, such as rutile or anatase. The nano-material may also be a mixture of crystalline phases, in any combination.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWING

In order that the manner in which the above-recited and other features and advantages of the invention are obtained and will be readily understood, a more particular description of the invention briefly described above will be rendered by reference to a specific representative embodiment thereof that is illustrated in the appended drawing. Understanding that the drawing depicts only a typical embodiment of the invention and is not therefore to be considered to be limiting of its scope, the invention will be described and explained with additional specificity and detail through the use of the accompanying drawing in which.

DETAILED DESCRIPTION OF THE INVENTION

Figure 1:
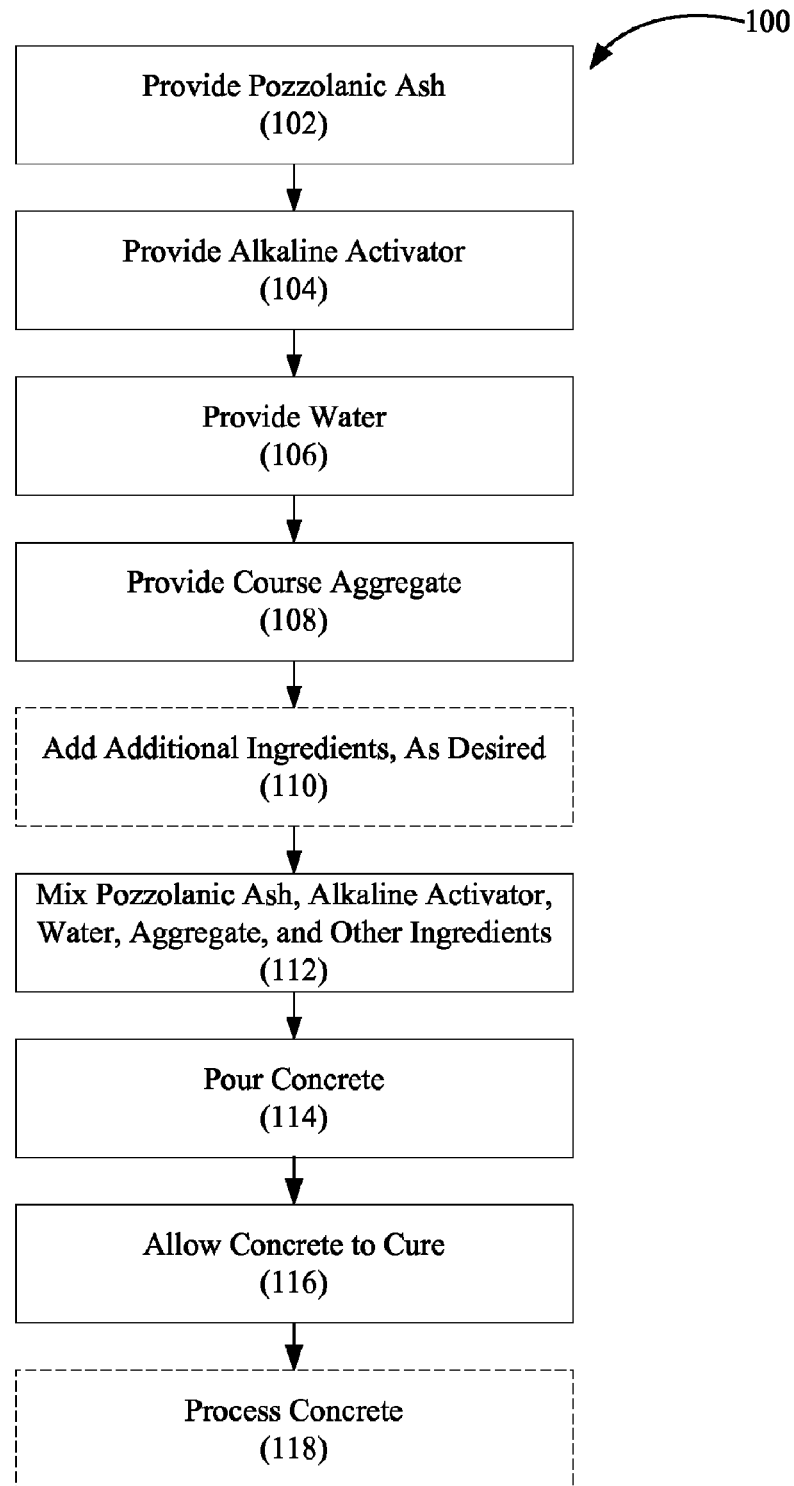
FIG. 1 illustrates a representative embodiment of a method for making a pervious concrete comprising a geopolymerized pozzolanic ash binder.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable aggregates, pozzolanic ashes, activator solutions, etc., to provide a thorough understanding of embodiments of the invention. One having ordinary skill in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

The present invention relates to a pervious concrete. As used herein, the term concrete may refer to a material made by mixing a cementing material, such as a geopolymerized pozzolanic ash binder and/or a Portland cement, with an aggregate and sufficient water to cause the cement to set and bind the mixture. Generally, the described pervious concrete is made from a mixture of a solid aggregate and a geopolymerized pozzolanic ash binder. This concrete tends to have a porous, open-cell structure that allows water to readily pass through it. To provide a better understanding of the described pervious concrete, the coarse aggregate and geopolymerized pozzolanic ash are described below in more detail.

With respect to the solid aggregate, the pervious concrete can comprise any suitable solid aggregate that is capable of binding with a geopolymerized pozzolanic ash binder to form a pervious concrete. Because a void content of the concrete can be enhanced by limiting or controlling the size and quantity of fine aggregate used in the pervious concrete, in some embodiments, the aggregate is sized to promote a void content of between about 5% and about 35% in the cured concrete material.

Some examples of suitable aggregates include crushed, freshly-mixed concrete; crushed, waste concrete; aggregate from boiler slag, fly ash, bottom ash, and/or another pozzolanic ash made as a coal-combustion byproduct; recycled carpet; and mixtures thereof. In some embodiments, the aggregate is made from recycled materials. Indeed, in some instances, the aggregate is made from a recycled carpet that has been pelletized into solid pellets. In other instances, where the aggregate comprises crushed concrete, the concrete is obtained from excess and unused, freshly-mixed concrete or from construction and demolition debris. Because the coarse aggregate can comprise readily-available recycled materials, in some embodiments, no virgin Portland cement or virgin crushed stone is required for the manufacture of the pervious concrete. By eliminating the use of Portland cement, the described pervious concrete also eliminates the environmental cost associated with manufacturing Portland cement, including the carbon dioxide emissions that are associated with Portland cement.

With respect to the geopolymerized pozzolanic ash binder, the binder comprises a pozzolanic ash that is mixed with a sufficient quantity of an alkaline activator and water to initiate a geopolymerization reaction. To provide a better understanding of the geopolymerized pozzolanic ash binder, the pozzolanic ash and alkaline activator are discussed below in more detail.

The pozzolanic ash can comprise one or more of a variety of finely-divided mineral residues from the combustion of a solid fuel, wherein the residues are capable of forming a cementitious compound. Generally, the pozzolanic ash comprises aluminum and silicon. For instance, the pozzolanic ash is typically made of silicon dioxide ("$SiO_2$"), aluminum oxide ("$Al_2O_3$"), and iron oxide ("$Fe_2O_3$"). Some non-limiting examples of such pozzolanic ashes comprise fly ash, spray dryer ash ("SDA"), bottom ash, bark ash, bottom slag, boiler slag, and mixtures thereof. In some embodiments, however, the pozzolanic ash comprises fly ash or SDA.

Where the pozzolanic ash comprises fly ash, the fly ash can be obtained from any suitable source. For instance, the fly ash can be collected from coal-burning power plants and from industrial boilers (e.g., boilers from paper/pulp producing industries). While the specific ingredients and concentration of ingredients in fly ash vary depending on the power plant configuration, boiler type, coal type, and upon other similar factors, fly ash typically contains inorganic, incombustible matter that was present in the coal or fuel and that is fused together during combustion into a glassy, part amorphous and part crystalline structure. As fly ash is suspended in exhaust gases, it is often solidified before being collected by electrostatic precipitators or by filter bags. Because the particles solidify while they are suspended in the exhaust gases, fly ash particles are typically spherical in shape and range in size from about 0.5 μm to about 100 μm in diameter.

Where the pozzolanic ash comprises fly ash, the fly ash can be of any quality that allows the fly ash to geopolymerize when mixed with the alkaline activator (discussed below) and to form a concrete mixture when combined with the previously described aggregate. For example, the fly ash can comprise a premium-quality, a standard-quality, and even a low-quality fly ash, as are known in the art. Indeed, because low-quality fly ash is typically inexpensive, as compared to premium-quality and standard-quality fly ash, in some embodiments, low-quality fly ash may be desirable.

Additionally, where the pozzolanic ash comprises fly ash, the fly ash can be selected from any class of fly ash that has pozzolanic properties. In one example, the pozzolanic ash is selected from class F and/or class C fly ash. Indeed, in some embodiments, the pozzolanic ash comprises class C fly ash, which is often considered to have a higher level of pozzolanic activity than class F fly ash. As used herein, the term class F fly ash may refer to a fly ash that is produced by burning anthracite, bituminous coals, and/or similar compounds. Additionally, as used herein, the term class C fly ash may refer to a fly ash that is produced from the combustion of lignite, sub-bituminous coals, and/or other similar compounds. In some cases, class C fly ash also contains significant amounts (higher than 10%) of calcium oxide ("CaO") or lime. Some additional characteristics of class F and class C fly ash are designated below in Table 2.

TABLE 2

Chemical Requirements for Fly Ash Classification

| Properties | Fly Ash Class | |
| --- | --- | --- |
| | Class F | Class C |
| Silicon dioxide, aluminum oxide, iron oxide ($SiO_2 + Al_2O_3 + Fe_2O_3$), min, % | 70.0 | 50.0 |
| Sulfur trioxide ($SO_3$), max, % | 5.0 | 5.0 |
| Moisture Content, max, % | 3.0 | 3.0 |
| Loss on ignition, max, % | 6.0 | 6.0 |

Where the pozzolanic ash comprises SDA, the SDA may have any suitable characteristic. As used herein, the term SDA may refer to a byproduct produced by a dry sorbent that is injected into a flue stream, which is typically upstream from the particulate control device (such as an electrostatic precipitator (ESP, a bag-house, and/or a flue gas desulfurization (FGD) system. By way of explanation, many coal-combustion processes utilize pollution control systems to remove sulfur and nitrogen combustion products from the flue gas. For example, many FGD systems include wet scrubbers, spray dry scrubbers, sorbent injectors, selective catalytic reactors (SCRs), and a combined sulfur oxide ($SO_x$) and nitrogen oxide ($NO_x$) process. FGD sorbents include, but are not limited to, lime, limestone, sodium-based compounds, and high-calcium coal fly ash. Ammonia or urea can also be added to control the SO3 concentration. One known FGD system employs a dry sorbent injection process where the SO3 sorbent is a powdered sodium sesquicarbonate that is blown into an air duct containing the flue gases. Sodium sesquicarbonate (systematic name trisodium hydrogendicarbonate, ($Na_3H(CO_3)_2$)) is a double salt of sodium bicarbonate and sodium carbonate ($NaHCO_3.Na_2CO_3$). The dihydrate ($NaHCO_3.Na_2CO_3.2H_2O$) occurs in nature as the mineral trona. Trona and/or carbonate are commonly used in the dry sorbent injection process to control or remove sulfur combustion products $SO_x$ (e.g., $SO_2$ and/or $SO_3$), which could otherwise result in a blue plume of smoke being emitted from the flue.

Continuing with the discussion of SDA, flue gases react with a powdered FGD sorbent, such as trona, hydrated lime, or sodium carbonate to neutralize the sulfur oxides ($SO_x$) present in the flue gases and to form safe byproducts. The byproducts and any excess trona powder are typically removed from the flue gas stream using an ESP. The clean air is then discharged into the atmosphere through the exhaust stack. The material recovered in the ESP is known as SDA and includes a mixture of fly ash, reaction products, and/or reacted trona and $SO_x$, as well as unreacted trona. While the precise composition of SDA will vary from one coal-combustion plant to another, SDA predominantly contains fly ash (about 70%) with its remaining components being the reaction products of trona, sulfur oxides, and unreacted trona. Indeed, SDA typically comprises at least about 2.5 wt. % unreacted trona. For instance, some SDA samples contain at least about 10 wt. % unreacted trona.

No matter which type of pozzolanic ash (e.g., fly ash, SDA, bottom ash, etc.) is used to create the described pervious concrete, the pozzolanic ash may have any suitable amount of carbon that allows the pozzolanic ash to function as intended. Indeed, in some embodiments, the pozzolanic ash used to make the geopolymerized ash binder comprises less than about 50% carbon, by weight. In other embodiments, the pozzolanic ash comprises less than about 20% carbon by weight (e.g., between about 1% and about 20% carbon). In yet other embodiments, the pozzolanic ash comprises less than about 15% carbon, by weight. In still other embodiments, the pozzolanic ash comprises less than about 5% carbon, by weight.

Regarding the alkaline activator, the activator may comprise one or more of a variety of chemicals that have a sufficiently high pH for, and which are otherwise capable of, initiating a geopolymerization reaction when the activator (or a solution thereof) is reacted with the pozzolanic ash. Moreover, while one or more ingredients of the alkaline activator may comprise pure ingredients, in some embodiments, the alkaline activator comprises recycled byproducts of industrial processes. Some non-limiting examples of suitable ingredients of the alkaline activator can include a metal carbonate, a metal silicate, a metal aluminate, a metal sulfate, a metal hydroxide, and mixtures thereof. Traditional activators may include, but are not limited to sodium- or potassium-based alkaline solutions, such as potassium silicate, sodium aluminate, etc. In some embodiments, alkali metals, such as sodium or potassium, are used because of their availability and cost. Other metals may also be used, including, but not limited to, alkaline earth metals, such as calcium or magnesium. That said, in some embodiments, the alkaline activator comprises an alkali carbonate, such as sodium carbonate ($Na_2CO_3$); an alkali hydroxide, such as sodium hydroxide (NaOH); or a mixture thereof.

The aggregate, pozzolanic ash, and alkaline activator can be added together and mixed or otherwise combined in any suitable manner that forms the described pervious concrete. One representative embodiment of a suitable method 100 for forming the pervious concrete is illustrated in FIG. 1. Specifically, FIG. 1 shows the method 100 begins at 102 by providing the pozzolanic ash (e.g., fly ash, SDA, and/or another suitable pozzolanic ash).

At 104, the method 100 continues by providing the alkaline activator. In this portion of the method 100, any amount of activator that is capable of initiating a geopolymerization reaction when combined with the pozzolanic ash and water may be added to the pozzolanic ash. In some embodiments, for instance, between about 1 and about 20 parts of the alkaline activator are added for every 100 parts of the pozzolanic ash, by dry weight. In other embodiments, between about 2 and about 12 parts of the alkaline activator are added for every 100 parts of the pozzolanic ash, by dry weight. In still other embodiments, however, between about 3 and about 10 parts of the alkaline activator are added for every 100 parts of the pozzolanic ash, by dry weight. For instance, for every 100 grams of pozzolanic ash, 1 gram of NaOH and 2.5 grams of $Na_2CO_3$ can be added to the ash to initiate the geopolymerization reaction.

At 106, FIG. 1 shows the method 100 continues by providing water. Any amount of water that allows the pozzolanic ash, the alkaline activator, and the water to be mixed as a homogenous solution may be used to form a paste-like binder slurry ("binder paste"). However, because concrete strength often decreases as the amount of water added to the mix increases and because most if not all of the water added to pozzolanic ash needs to be evaporated to form the pervious concrete, care is taken to minimize the amount of water added. Thus, while water can be added to the pozzolanic ash (e.g., by being added to the activator and then to the ash and/or by being added directly to the ash) to form a solution in which only about 1% of the solution, by weight, comprises solid materials (e.g., the pozzolanic ash), less water is added to the ash. In some embodiments, enough water is added to the pozzolanic ash to ensure that solid materials (e.g., pozzolanic ash) account for more than about 20% of the weight of the solution. In still other embodiments, only enough water is added to the pozzolanic ash to allow at least about 40% of the solution, by weight, to comprise solid materials. In still other embodiments, only enough water is added to ensure that between about 60% and about 80% of the solution comprises solid materials.

As the alkaline activator and water are added to and mixed with the pozzolanic ash, the geopolymerization reaction begins. Specifically, geopolymerization occurs through the chemical dissolution of silica and alumina-based oxides within the pozzolanic ash. This dissolution occurs with the addition of the alkaline activator, followed by the subsequent recondensation of various aluminosilicate oxides, which yield polymeric Si—O—Al—O bonds. Geopolymer materials are three dimensional aluminosilicate networks that form inorganic mineral polymers, which contain a variety of amorphous and semi-crystalline phases. As used herein, the term geopolymer may represent a broad class of materials characterized by Al—Si repeating units. Some examples of such repeating units include, but are not limited to, repeating units comprising poly(sialate) (—Si—O—Al—O—) repeating units, poly(sialate-siloxo) (—Si—O—Al—O—Si—O—) repeating units, and poly(sialate-disoloxo) (—Si—O—Al—O—Si—O—Si—O—) repeating units.

Returning back to FIG. 1, the method 100 continues at 108 by providing the coarse aggregate. While the coarse aggregate and the binder paste comprising the pozzolanic ash and alkaline activator can be added together in any suitable manner, in some embodiments, the binder paste is added to the aggregate. The amount of binder paste added to the aggregate is may be controlled so that a thick coating of the binder paste around the aggregate particulates is obtained. Using sufficient paste to coat and bind the aggregate particulates together creates the system of highly permeable, interconnected voids that allows the described pervious concrete to drain quickly.

At this point in the method or at any other suitable point, FIG. 1, at 110, shows the method 100 continues by optionally adding one or more additional ingredients to be mixed with the aggregate and binder paste. In one example, sand is added to the mixture. However, because sand tends to reduce the void content of the finished concrete, in some embodiments, only enough sand is added to ensure that the void content of the finished concrete is between about 5% and about 35% (e.g., between about 10% and about 25% or between about 15% and about 20%), depending on the desired use for the concrete. It will be appreciated by those of skill in the art that the steps of providing and mixing individual elements may be accomplished in a variety of orders and still achieve the teachings of the invention.

In another example, while the pervious concrete need not include any Portland cement, in some embodiments, Portland cement is added to the concrete mixture until the ratio of Portland cement to pozzolanic ash in the cement mixture is between about 99:1 and about 1:99. In other embodiments, the final ratio of Portland cement to pozzolanic ash in the mixture is less than about 9:1. In still other embodiments, Portland cement is added to the concrete mixture until the ratio of Portland cement to pozzolanic ash in the mixture is less than about 4:1. In some embodiments, the ratio of Portland cement to pozzolanic ash in the cement mixture is less than about 2.33:1. In other embodiments, the ratio of Portland cement to pozzolanic ash in the cement mixture is less than about 1.5:1. In still other embodiments, the ratio of Portland cement to pozzolanic ash in the cement mixture is less than about 1:1 (e.g., less than about 1:1.5, less than about 1:2.33, less than about 1:4, or less than about 1:9).

In still another example, ingredients that are typically added to concrete mixtures can be added to the pervious concrete mixture, as desired. Some non-limiting examples of such ingredients include plasticizers and AEAs.

In yet another example, ingredients that provide enhanced mechanisms for pollutant filtration and/or destruction are optionally added to the pervious concrete mixture. In some embodiments, these ingredients for pollutant filtration and/or destruction comprise one or more catalytic nano-materials that are capable of catalyzing the oxidation of organic pollutants (e.g., oil). Such nano-materials may function in any suitable manner. For instance, some nano-materials may become excited and produce radicals when exposed to ultraviolet light (e.g., from sunlight). In such instances, the radicals can be capable of organic reactivity that allows them to breakdown contaminants to harmless materials.

The nano-materials may be in the form of nanocrystalline metallic oxides and/or metallic peroxides. Additionally, these nano-materials may be in an amorphous phase or crystalline phases, such as rutile or anatase. Furthermore, the nano-materials may be a mix of crystalline phases, in any combination. Some non-limiting examples of these materials include titanium dioxide (i.e., nano-titanium dioxide), magnesium peroxide, magnesium oxide (i.e., nano-magnesium oxide), nano-alumina, platinized alumina, and nano-calcium oxide. The nano-materials may also be a combination of several different mixtures of nano-materials, including, but not limited to, a mixture of nano-alumina and nano-titanium dioxide.

During or after the addition of the various ingredients to the concrete mixture, at 112, FIG. 1 shows the method 100 includes mixing or otherwise combining the ingredients of the concrete mixture together.

Once the ingredients of the concrete mixture are mixed sufficiently, FIG. 1, at 114, shows the mixture is poured, pumped, or otherwise placed in a desired location. In some embodiments, the pervious concrete mixture is pre-cast and formed (e.g., poured into molds and/or cut) as pavers. As used herein, the term paver and variations thereof may refer to a pre-cast concrete shape (e.g., a slab, brick, block, tile, wall, stone, panel, etc., or other pre-cast concrete structure). In other embodiments, however, the pervious concrete is poured as a geotechnical fill (replacing unstable soil to reduce subsistence of roadways, bridges, and other structures); as a backfill; as an annular grouting; as a shock absorber in earthquake zones; as a footing in underground structures to reduce loads; as a void filler in silos, abandoned mines, underground tanks, pipelines, etc.; as a hydrostatic-pressure reducer for retaining walls; as a pavement for roads, parking lots, driveways, sidewalks, patios, etc.; or for any other suitable purpose.

At 116, FIG. 1 shows the method 100 continues as the pervious concrete is allowed to cure. This curing process can be accomplished in any suitable manner, including, but not limited to, curing the pervious concrete in air, at an ambient temperature, curing the concrete with a lime-water solution, and/or exposing the concrete to a supplemental heat source.

At 118, FIG. 1 shows the pervious concrete is optionally processed. Indeed, the concrete can be processed in any suitable manner and at any suitable time during the method 100. Some non-limiting examples of suitable processing techniques that can be performed on the concrete include heat treating, moisture curing, coloring, tumbling, texturizing, or otherwise treating the concrete to obtain a desired characteristic.

The described method 100 may be modified in any suitable manner. For example, the various aspects and elements of the method 100 can be removed, added to, and/or be reordered in any suitable manner. In one example, instead of providing the pozzolanic ash before providing the alkaline activator and the water, the water and/or alkaline activator are provided before the pozzolanic ash. Accordingly, in this example, the pozzolanic ash is added to the water and/or the alkaline activator.

In another example, where SDA is used as the pozzolanic ash, a smaller amount of one or more ingredients of the alkaline activator can be used to form a geopolymerized ash from SDA than would be possible where the geopolymerized ash is formed with another ash, such as class C fly ash or class F fly ash, which are both substantially free from unreacted trona. For instance, because unreacted trona in the SDA contains carbonate compounds that can help initiate a geopolymerization reaction, the alkaline activator used to geopolymerize the SDA may comprise less alkali carbonate, such as sodium carbonate ($Na_2CO_3$), than would be required for a geopolymerization reaction involving class C or class F fly ash. It should be noted that while the use of SDA as the pozzolanic ash may reduce the amount of alkali carbonate required to cause the geopolymerization reaction, the amount of alkali hydroxide, such as sodium hydroxide (NaOH), used to initiate the geopolymerization reaction of SDA may be substantially equal to the amount of alkali hydroxide that would required to initiate a geopolymerization reaction of an equal amount of another pozzolanic ash that is substantially free from unreacted trona (e.g., class C or F fly ash).

In yet another example, because the type of activator, pH level, water content, particle size, calcium content, amount and type of contaminants, and crystallinity of the pozzolanic ash all have strong effects on the final structure and physical characteristics of a pervious concrete structure that comprises little or no Portland cement, each of these characteristics can be varied to obtain desired characteristics for specific applications.

In addition to the aforementioned beneficial characteristics of the described pervious concrete, the concrete may have a variety of other beneficial and advantageous characteristics. In one example, the pervious concrete allows for air and/or water to flow through the concrete's matrix. In some embodiments, the pervious concrete allows water to flow through the concrete at a rate that is typically around 480 inches/hour (0.34 centimeters/second, which is about 5 gallons/foot$^2$/minute or about 200 liters/meter$^2$/minute). In other embodiments, the flow rate is much higher.

Where the pervious concrete allows water to drain through the concrete's matrix to the underlying soil, the pervious concrete may provide several environmental and/or non-environmental advantages. For instance, the pervious concrete can allow rain and runoff to recharge the water table below the concrete. Additionally, the pervious concrete can help to reduce storm runoff, which might otherwise contaminate the waterways and impact storm water systems. The pervious concrete may also reduce the chances of flooding by dispersing surface water into the ground. Moreover, because rain and other sources of water can seep through the pervious concrete directly into the ground, the pervious concrete can provide urban trees and vegetation with viable root space. Furthermore, the pervious concrete may make driving safer due to better tire skid resistance. The pervious concrete may also reduce land development infrastructure costs by reducing or eliminating storm drain requirements or water retention facilities. Additionally, pervious concretes/pavements within the scope of the present invention may contain advanced materials designed to help biodegrade oils or other organics present from cars or trucks.

In another example, the pervious concrete can help to reduce or filter pollutants in water that flows through the concrete—even without the presence of the described nanomaterials. Typically, the most common urban stormwater pollutants from traditional non-pervious pavements include sediment, nutrients, oil and grease, bacteria, and heavy metals. Without being bound by theory, it is believed that metals, such as cadmium and lead that can be released by automobile corrosion and mechanical wear, are captured in the pervious concrete's voids along with minute sediment particles, to which the ions are frequently attached.

Capturing the metals prevents them from washing downstream and accumulating in the environment. It is further theorized that naturally occurring micro-organisms may collect in the concrete's voids where the micro-organisms may digest oil or other organic pollutants that may be leaked from automobiles. These pollutants are believed to be broken down into carbon dioxide and water. Thus, the pollutants can be mitigated prior to making it into the soil or groundwater system. In other words, the described pervious concrete can combine pavement function with stormwater management in a single structure. Accordingly, the pervious concrete can be less expensive than "traditional systems" involving impervious pavements combined with separate stormwater management facilities.

In yet another example of a benefit of the pervious concrete, the concrete can provide an environmentally-friendly method for disposing of waste materials, such as pozzolanic ashes; waste concrete; construction debris; recycled carpets; highly alkaline waste chemicals, which would otherwise be neutralized and landfilled; etc. Similarly, the pervious concrete can be produced with only moderate energy requirements.

In a final example, it is theorized that the geopolymerization reaction can form a geopolymer around carbon in the pozzolanic ash. Accordingly, the carbon in the ash can be prevented from absorbing expensive AEAs added to the concrete.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES

Example 1

TABLE 3

Compression Test Results of Various Non-geopolymerized Concrete Samples.

| Sample Name | Ratio of Portland Cement (PC) to Fly Ash | Compression Test Results in (MPa) |
|---|---|---|
| Sample A | 1:0 (e.g., 100% PC) | ~24 |
| Sample B | 2.33:1 (e.g., 70% PC and 30% Fly Ash) | ~38 |
| Sample C | 1:1 (e.g., 50% PC and 50% Fly Ash) | ~33 |
| Sample D | 0:1 (e.g., 100% Fly Ash) | ~0.2 |
| Sample E | 0:1 (e.g., 100% Geopolymerized Fly Ash) | ~20 |

In a first hypothetical example, Table 3 shows that 5 samples of 50 mm concrete cubes comprising different concentrations of Portland cement and/or a fly ash are made by mixing the Portland cement, sand, and/or fly ash together with water and a conventional plasticizer. Standard mortar casting procedures are used. Each mixture is thoroughly mixed for 5 minutes, cast into the 50 mm cube molds, and then be allowed to cure for 7 days in a lime water solution. It is important to note that in this example, the Samples A through D would are cured, but the pozzolanic ash in the samples would not be geopolymerized.

Once the Samples A through D are cured, compression tests are recorded for each. Table 3 shows that in Sample B, a concrete cube having a ratio of about 2.33 parts Portland cement for every 1 of part fly ash, the compressive strength of the cube is expected to increase relative to the cube in Sample A, which contains Portland cement, but not fly ash. Additionally, Table 3 shows that in Sample D, a concrete cube that comprises fly ash but not Portland cement, the compressive strength of the cube is expected to decrease significantly relative to all other samples.

Table 3 illustrates that a fifth sample, Sample E, comprises a geopolymerized concrete cube made from 100% recycled fly ash. In this case, a solution of sodium silicate and sodium hydroxide is used as the alkaline activator for the geopolymerization reaction. Table 3 shows that after Sample E is cured, the compressive strength of the cube in Sample E is expected to increase significantly (perhaps up to 20 MPa) relative to the 100% fly ash sample shown in Sample D (0.2 MPa). This shows that the geopolymer concrete binders are superior in strength relative to certain samples that are not geopolymerized.

Example 2

In a second example, 50 mm concrete cubes of samples comprising Portland cement and bark ash at a ratio of about 2.33 parts Portland cement for about every 1 part of bark ash are prepared. The bark ash is mixed with Portland cement, sand, water, and a plasticizer. The bark ash is then geopolymerized. Table 4 provides four different bark ash samples with possible surface area sizes and particle size ranges that could be obtained from testing the samples.

TABLE 4

Characteristics of Geopolymerized Bark-ash-containing Cement Samples

| Sample Name | Activator Solution | Possible Surface Area ($m^2/g$) ranges | Possible Particle Size (μm) ranges |
|---|---|---|---|
| MS-DC | $Na_2CO_3$ + NaOH | 25-50 | 210-250 |
| MS-BH | $Na_2CO_3$ + NaOH | 40-70 | 5-25 |
| W-DC | $Na_2CO_3$ + NaOH | 30-45 | 40-70 |
| W-Precip | $Na_2CO_3$ + NaOH | 100-120 | 100-120 |

It is anticipated that compression testing of the 4 bark ash samples in Table 4 could show that the 4 samples in that table have compressive strengths that range from about 1 MPa to about 20 MPa and possibly higher depending on the sample and the percentage of composition materials. These particular mix designs could be used as a Portland cement substitute. Additionally, to reduce costs and benefits to the environment, the bark ash in these samples could be obtained from several different pulp and paper mills located in the US.

While specific embodiments and examples of the present invention have been illustrated and described, numerous modifications come to mind without significantly departing from the spirit of the invention, and the scope of protection is only limited by the scope of the accompanying claims.

The invention claimed is:

1. A pervious concrete material comprising:
   a solid aggregate material; and
   a geopolymerized pozzolanic ash binder present in an amount sufficient to bind the aggregate material into a solid mass containing a void content of between about 5% and about 35%.

2. The pervious concrete material according to claim 1, wherein the geopolymerized pozzolanic ash binder comprises a pozzolanic ash selected from the group consisting of fly ash, bark ash, bottom ash, spray dryer ash, bottom slag, boiler slag, and mixtures thereof.

3. The pervious concrete material according to claim 2, wherein the pozzolanic ash comprises fly ash.

4. The pervious concrete material according to claim 1, wherein the solid mass is in the form of a pervious pre-cast concrete shape.

5. The pervious concrete material according to claim 1, wherein the solid mass is in the form of a pervious pavement surface.

6. The pervious concrete material according to claim 1, wherein the solid aggregate comprises recycled concrete.

7. The pervious concrete material according to claim 1, wherein the solid aggregate comprises recycled carpet.

8. The pervious concrete material according to claim 1, wherein the solid aggregate comprises recycled aggregate made from coal-combustion byproducts.

9. The pervious concrete material according to claim 1, wherein a ratio of Portland cement to a pozzolanic ash in the geopolymerized pozzolanic ash binder is less than about 2.33:1.

10. The pervious concrete material according to claim 1, wherein a ratio of Portland cement to a pozzolanic ash in the geopolymerized pozzolanic ash binder is less than about 1:1.

11. The pervious concrete material according to claim 1, wherein no Portland cement is used.

12. The pervious concrete material according to claim 1, further comprising a catalytic nano-material selected to catalyze an oxidation of organic pollutants.

13. The pervious concrete material according to claim 12, wherein the catalytic nano-material comprises a substance selected from the group consisting of titanium dioxide, magnesium peroxide, magnesium oxide, nano-alumina, platinized alumina, nano-calcium oxide, and mixtures thereof.

14. A pervious concrete material comprising:
   a solid aggregate material; and
   a geopolymerized pozzolanic ash binder formed from a pozzolanic ash and a sufficient quantity of an alkaline activator and water to initiate a geopolymerization reaction;
   wherein the geopolymerized pozzolanic ash binder is present in an amount sufficient to bind the aggregate material into a solid mass containing a void content of between about 5% and about 35%; and
   wherein a ratio of Portland cement to the pozzolanic ash in the pervious concrete is less than about 2.33:1.

15. The pervious concrete material of claim 14, wherein the solid aggregate comprises a material selected from the group consisting of recycled concrete, recycled carpet, recycled aggregate made from coal-combustion byproducts, and combinations thereof.

16. The pervious concrete material of claim 14, wherein the solid mass is in the form of a pervious pre-cast concrete shape.

17. The pervious concrete material of claim 14, wherein the sufficient quantity of the alkaline activator comprises between about 0.5 and about 20 grams of the alkaline activator for every 100 grams of the pozzolanic ash.

18. The pervious concrete material of claim 14, further comprising a catalytic nano-material selected from the group consisting of titanium dioxide, magnesium peroxide, magnesium oxide, nano-alumina, platinized alumina, nano-calcium oxide, and mixtures thereof.

19. A method for forming a pervious concrete, the method comprising:
   providing a solid aggregate material; and
   providing a geopolymerized pozzolanic ash binder present in an amount sufficient to bind the aggregate material into a solid mass containing a void content of between about 5% and about 35%.

20. The method of claim 19, wherein a ratio of Portland cement to a pozzolanic ash in the geopolymerized pozzolanic ash binder is less than about 1:1.

21. The method of claim 19, further comprising providing a catalytic nano-material selected to catalyze an oxidation of organic pollutants.

22. The method of claim 19, wherein the solid aggregate comprises a material selected from the group consisting of a recycled concrete, a recycled carpet, a recycled aggregate made from coal-combustion byproducts, and combinations thereof.

23. A pervious concrete material comprising:
   a solid aggregate material; and
   a binder comprising geopolymerized pozzolanic ash formed from a pozzolanic ash and a sufficient quantity of an alkaline activator and water to initiate a geopolymerization reaction, wherein the binder contains no Portland cement; and
   wherein the geopolymerized pozzolanic ash binder is present in an amount sufficient to bind the aggregate material into a solid mass containing a void content of between about 5% and about 35%.

* * * * *